United States Patent
Kim et al.

(10) Patent No.: US 12,325,319 B1
(45) Date of Patent: Jun. 10, 2025

(54) APPARATUS AND METHOD FOR AUTONOMOUS POWER GENERATION AND BATTERY RECHARGING IN ELECTRIC VEHICLES

(71) Applicant: K-TECHNOLOGY USA, INC., Los Angeles, CA (US)

(72) Inventors: Ki Il Kim, Los Angeles, CA (US); Young Kim, Los Angeles, CA (US); Sarah Duncanson, Los Angeles, CA (US); Paul Kim, Beverly Hills, CA (US)

(73) Assignee: K-TECHNOLOGY USA, INC.

( * ) Notice: Subject to any disclaimer, the term of this patent is extended or adjusted under 35 U.S.C. 154(b) by 0 days.

(21) Appl. No.: 19/046,486

(22) Filed: Feb. 5, 2025

(51) Int. Cl.
*B60L 53/56* (2019.01)
*B60L 53/20* (2019.01)
*B60L 53/52* (2019.01)
*H02J 7/14* (2006.01)

(52) U.S. Cl.
CPC .............. *B60L 53/56* (2019.02); *B60L 53/20* (2019.02); *B60L 53/52* (2019.02); *H02J 7/14* (2013.01)

(58) Field of Classification Search
CPC .......... B60L 53/56; B60L 53/20; B60L 53/52; H02J 7/14
See application file for complete search history.

(56) References Cited

U.S. PATENT DOCUMENTS

| | | | | |
|---|---|---|---|---|
| 4,233,858 A * | 11/1980 | Rowlett | ................... | B60K 6/30 290/22 |
| 4,423,794 A * | 1/1984 | Beck | ....................... | B60K 6/30 477/3 |
| 7,810,589 B2 * | 10/2010 | Frierman | .................. | F03D 9/32 180/2.2 |
| 9,160,222 B1 | 10/2015 | Kim et al. | | |
| 11,267,335 B1 * | 3/2022 | Knickerbocker | ..... | F03D 3/0409 |
| 2023/0187145 A1 * | 6/2023 | Macaluso | .............. | H01G 11/08 320/167 |

\* cited by examiner

*Primary Examiner* — Carlos Amaya
(74) *Attorney, Agent, or Firm* — NKL Law; Jae Youn Kim

(57) ABSTRACT

An apparatus, system and method for autonomous power generation and recharging in electric vehicles (EVs) enhance the energy sufficiency of EVs by enabling EVs to autonomously generate electricity during both motion and stationary conditions, reducing reliance on external charging stations. In some examples, a flywheel-based energy generation system stores rotational energy and transfers it to a generator for electricity production. Through the features such as flywheels with weight control balls, gear-based or gearless configurations, and optional wind-capturing blades, the system maximizes autonomous power generation and energy conversion.

14 Claims, 3 Drawing Sheets

APPARATUS AND METHOD FOR AUTONOMOUS POWER GENERATION AND BATTERY RECHARGING IN ELECTRIC VEHICLES

FIELD OF THE DISCLOSURE

The present disclosure relates to energy management systems for vehicles including electric vehicles (EVs). Specifically, it pertains to an apparatus and method for autonomously generating power, recharging a vehicle's battery, and/or supplying power directly to the vehicle's motors. The disclosure is compatible with a wide range of electric-powered facilities and vehicles, including passenger cars, pickup trucks, freight trucks, and trains.

BACKGROUND OF THE DISCLOSURE

Electric vehicles (EVs) have become a key technology for advancing sustainability in transportation. Despite their potential, the widespread adoption of EVs is hindered by several technical obstacles. EVs heavily rely on external charging stations to replenish energy. Limited availability of such infrastructure, especially in remote or underdeveloped areas, complicates long-distance travel. Additionally, existing charging technologies require extended periods to fully charge a battery, leading to user inconvenience.

Current energy recovery mechanisms, such as regenerative braking, only partially address the energy demands of EVs. While these systems convert a portion of the vehicle's kinetic energy into electricity, the recovered energy remains insufficient to meet the high power requirements of modern EVs. The advantages of EVs are also diminished by their dependence on electricity generated from fossil fuels. This reliance undermines their ability to reduce net carbon emissions. Moreover, the development and maintenance of charging infrastructure demand significant financial investment.

Finally, existing energy recovery systems are often mechanically complex, involving configurations such as shafts and axles. These designs increase the overall weight of the vehicle, raising manufacturing and maintenance costs while reducing efficiency.

Collectively, these challenges underscore the need for an innovative, efficient, and sustainable solution to EV energy management.

SUMMARY OF THE DISCLOSURE

The present disclosure overcomes the limitations of existing energy management systems in electric vehicles (EVs) by introducing a novel apparatus and method for autonomous power generation and recharging in EVs. The system enhances the energy sufficiency of EVs by enabling EVs to generate electricity autonomously during both motion and stationary conditions, significantly reducing reliance on external charging stations. This improvement increases operational independence and mitigates challenges associated with limited charging infrastructure.

The disclosure provides a flywheel-based energy generation and storage system, which stores rotational energy and transfers it to a generator for electricity production. The generator converts the rotational energy into electricity, which is stored in the vehicle battery or supplied to a traction motor for vehicle propulsion. Different flywheels can be used to accommodate diverse vehicle sizes and power demands. A weight control ball mounted on the flywheel's outer edge increases centrifugal force, enhancing rotational stability and optimizing the flywheel's inertial energy.

In one embodiment utilizing gears, various types of gears are employed to regulate the transfer of rotational energy from the flywheel to the generator. A larger gear is coupled with the flywheel, while smaller gears maintain a consistent rotational speed (RPM) for stable generator operation. These gears are modular, allowing for separate mounting or integration with the flywheel. To supplement energy generation, the system incorporates blades that capture wind energy produced during vehicle motion. These blades are adjustable in size and angle to match specific operational conditions, providing additional rotational force to the flywheel. Some blade designs may include weight control mechanisms to further enhance efficiency.

In the gearless embodiment, the flywheel and generator are connected through a flywheel connector, such as a coupling or joint. This connection eliminates frictional losses associated with gears, resulting in streamlined energy transfer, reduced mechanical complexity, and lower maintenance requirements while preserving high performance.

The generated electricity can either be stored in the vehicle's battery or supplied to a vehicle motor (e.g., a traction motor) for immediate use. An electric motor in EVs plays a role in initiating and sustaining flywheel rotation. It can operate independently of the vehicle's ignition, ensuring continuous power generation for battery recharging. The electric motor is wirelessly controllable via a vehicle key or mobile device, allowing for convenient and efficient energy management.

By addressing these challenges of conventional EV energy management, the present disclosure offers a comprehensive and transformative solution to power generation and distribution. It enhances energy independence, promotes the broader adoption of sustainable transportation technologies, and advances the transition to environmentally friendly mobility.

BRIEF DESCRIPTION OF THE DRAWINGS

For a better understanding of the various described embodiments, reference should be made to the description below, in conjunction with the following drawings in which reference numerals refer to corresponding parts throughout the figures.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The following description with reference to the accompanying drawing illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage devices such as one or more non-transitory memories or other type of hardware-based storage devices, either local or networked.

Although the following description uses terms "first," "second," and the like to describe various elements, these elements should not be limited by the terms. These terms are only used to distinguish one element from another. The terminology used in the description of the embodiments herein is for the purpose of describing a particular embodiment only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Throughout the specification, when an element is referred to as being "connected or coupled" to another element, it can be directly connected or coupled to the other element or intervening elements may be present.

Figure 1:
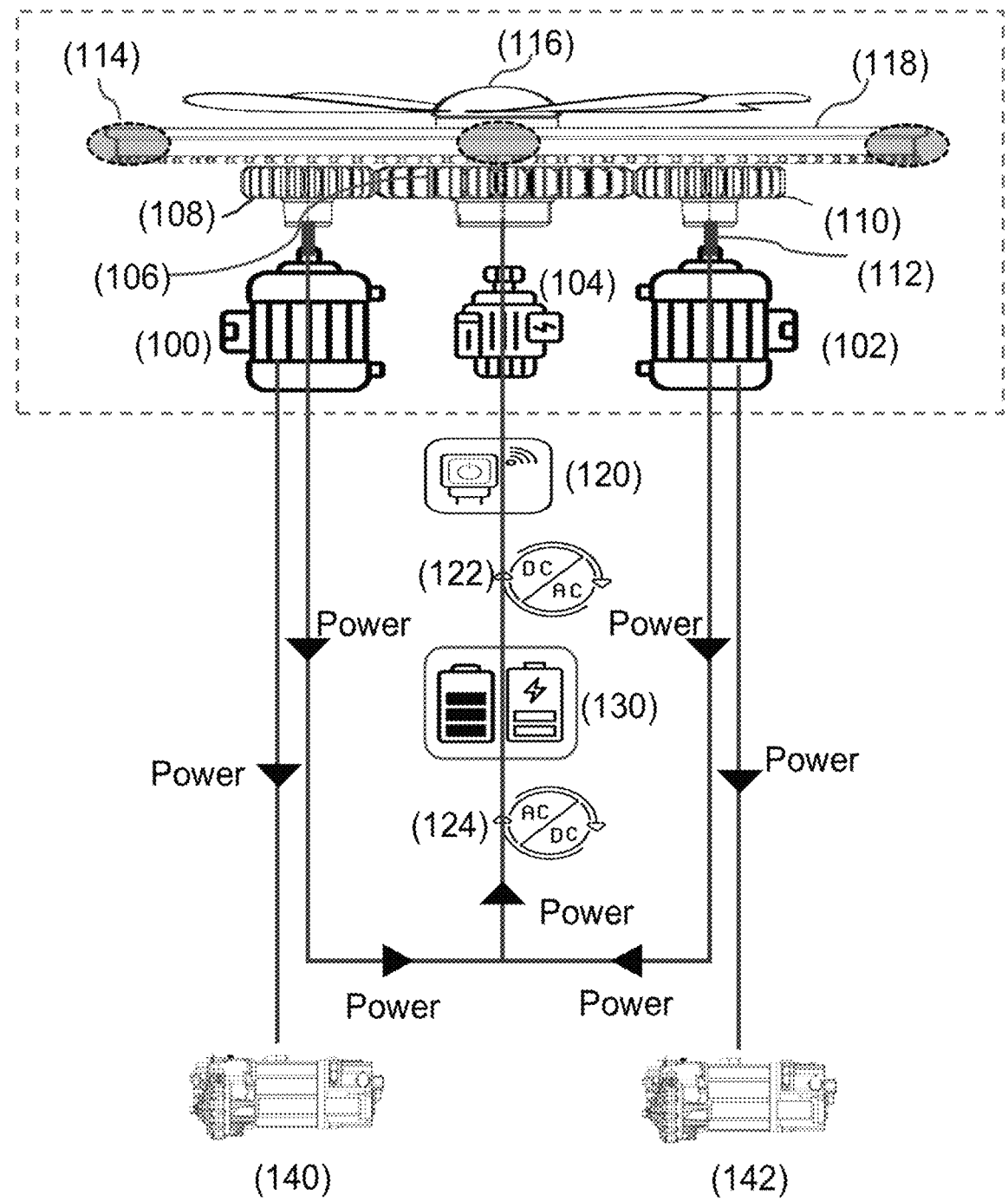
FIG. 1 illustrates an autonomous power generation and recharging system featuring a gear-based configuration in accordance with some embodiments.

FIG. 1 illustrates an embodiment of the autonomous power generation and recharging system featuring a gear-based configuration for efficient energy transmission. This system integrates a flywheel, a gear, a generator, an electric motor, and supplementary components to enable autonomous power generation, storage, and delivery during vehicle operation.

Referring to FIG. 1, a flywheel (118) stores rotational energy and transmits it to the generator (100, 102) to produce electricity. The flywheel is designed with an adjustable diameter, allowing customization based on the size and energy demands of the vehicle. For example, various flywheels with different diameters can be used, typically ranging from 20 to 40 inches but not limited to this range, to accommodate diverse vehicle sizes and power demands. To enhance rotational stability and maximize the flywheel's inertial energy, the outer edge of the flywheel can be equipped with a weight control ball (114). This configuration concentrates the flywheel's mass towards its outer edge, increasing its rotational inertia by augmenting centrifugal force. As a result, the flywheel can store more energy, ultimately enabling the generator to produce more power. The addition of the weight control ball significantly improves the flywheel's energy storage capacity.

The weight control ball can be made of carbon, metal, a combination of both, or others, and its size and material can be adjusted according to the vehicle's performance requirements.

Rotational energy from the flywheel is transmitted to the generator through a series of various types of gears (106, 108, 110) (e.g., a spur gear, a helical gear, etc.). The larger gear (106) connects to the flywheel, while smaller gears (108, 110), identical in size, ensure uniform rotational speed (RPM) for consistent generator operation. The flywheel diameter and gear ratios can be adjusted to suit the specific size and operational needs of a vehicle. The larger gear and the smaller gear have an optimized gear ratio to minimize energy loss between the flywheel and the generator. The embodiment in FIG. 1 shows that two smaller gears mesh with both sides of the larger gear. However, it would be readily apparent to a person having ordinary skill in the art that the system could also be implemented using only one smaller gear, or with a structure where the flywheel is coupled with the generator without intervening gears. Such variations demonstrate the flexibility of the design while maintaining the core functionality of the system.

These gears are modular, allowing for separate mounting or integration with the flywheel, thereby reducing manufacturing complexity, maintenance costs, and enabling component reuse. The modular design of the gears provides flexible installation options. One of the options is an integrated assembly, which the gears and flywheel are combined into a single unit, simplifying manufacturing and reducing installation complexity. Another option is a separate mounting, which the gears are mounted independently of the flywheel, allowing for easier maintenance, component reuse, and enhanced flexibility in repairs. This modular approach balances cost efficiency with operational flexibility, making the system adaptable to various vehicle configurations. The flywheel diameter and gear ratios can be adjusted to suit the specific size and operational needs of a vehicle.

To supplement rotational energy, optional blades (116) can be positioned in front of the flywheel to capture wind energy generated during vehicle motion. These blades provide additional force to the flywheel, boosting and improving overall energy generation efficiency. The blades are adjustable in size and angle to optimize performance under different wind conditions. The blades may also include the weight control ball on its outer edge to further enhance energy capture.

An electric motor (104) supplies the initial force to rotate the flywheel and sustains its motion when needed. Powered by the vehicle's battery (130), the electric motor can continue operating even when the vehicle's ignition is off. This ensures that the generator produces sufficient electricity to recharge the battery or supply power to the vehicle's motor (e.g., a traction motor). This can continue generating power for more hours after the vehicle ignition is turned off. The electric motor can be controlled wirelessly through a remote power on/off device (120), using a device such as a vehicle key or a mobile phone, allowing the users convenient system management.

The generator (100, 102) converts rotational energy from the flywheel into electricity, which passes through an inverter (122) or a converter (124). The generated electricity can be stored in the vehicle's battery for later use. Alternatively, the whole or a part of the electricity generated from the generator can be supplied to the vehicle's motor (e.g., a traction motor) (140, 142) for immediate use. This dual functionality provides operational flexibility by allowing the generated power to be either stored in the vehicle battery or supplied to a traction motor. The direct power delivery to the traction motor reduces energy loss associated with battery storage, enhances energy efficiency and supports extended operational range, making it particularly beneficial during long-distance travel.

This system is designed for flexible installation, either inside the vehicle (e.g., under seats) or externally (e.g., in the undercarriage or on the truck bed). The modular design allows for customization based on the vehicle's size, operational conditions, and energy requirements, making it suitable for a broad range of electric vehicles, including passenger cars, trucks, and larger vehicles.

By integrating mechanical components (e.g., flywheel, gears, and blades) with electrical elements (e.g., generator, inverter, and converter), the embodiment depicted in FIG. 1 addresses challenges in EV energy management. This robust, adaptable design improves energy efficiency, reduces reliance on external power sources, and supports sustainable and cost-effective operation.

Figure 2:
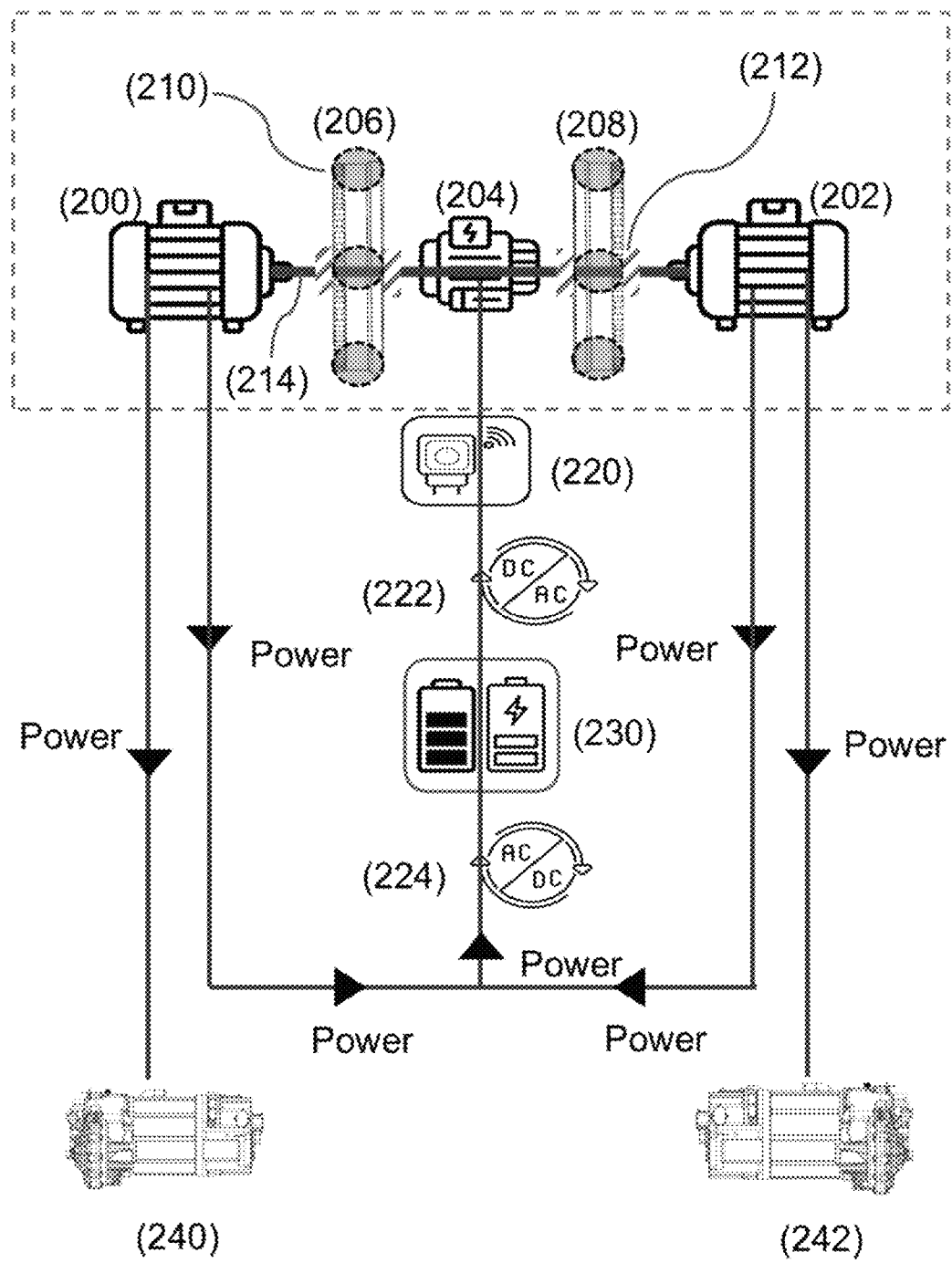
FIG. 2 depicts an autonomous power generation and recharging system employing a gearless configuration in accordance with some embodiments.

FIG. 2 depicts an embodiment of the autonomous power generation and recharging system employing a gearless configuration. By eliminating gears, this design simplifies the mechanical structure and enhances overall efficiency. Components include a flywheel, a flywheel connector, a generator, an electric motor, and optional auxiliary elements, all working together to efficiently generate, store, and deliver power.

The flywheel (206, 208) serves as the primary energy storage and transfer mechanism. It captures and stores rotational energy, which is then transferred to the generator (200, 202). The flywheel with various diameters, typically ranging from 20 to 40 inches but not limited to this range, enables compatibility with various vehicle sizes and energy requirements. In the embodiment depicted in FIG. 2, two flywheels and two generators are used. However, it would be apparent to a skilled artisan that the system could also be implemented using one flywheel thus employing a single generator.

A weight control ball (210) can be mounted on the outer edge of the flywheel to enhance rotational stability and maximize energy storage efficiency. Concentrating the flywheel's mass towards its outer edge increases its rotational inertia by augmenting centrifugal force, allowing the flywheel to store more energy. This weight enhancement increases the flywheel's rotational inertia and energy storage capacity, ultimately enabling the generator to produce more power.

The gearless configuration is achieved through the integration of a flywheel connector (212), which links the flywheel to the generator. This connector can take the form of couplings or joints. The couplings securely joining the flywheel and generator shaft, these components allow precise and stable energy transfer while absorbing minor vibrations and misalignments, reducing wear on the system. The joints provide flexible connections, joints compensate for slight misalignments in the system while maintaining efficient energy transfer. This connection eliminates the energy losses typically associated with gear friction, enhancing the system's efficiency and reducing mechanical complexity. The simplified structure also lowers maintenance requirements and extends the durability of the system.

The generator (200, 202) receives rotational energy from the flywheel. Operating at a uniform RPM due to the absence of gears, the generator ensures consistent and reliable power production. The generated electricity is routed through an inverter (222) or a converter (224), enabling dual-mode operation. The electricity can be stored in the vehicle's battery (230) for later use. The whole or a part of the electricity can be delivered to the vehicle's motor (e.g., a traction motor) (240, 242) for immediate use, reducing energy losses associated with battery storage and improving efficiency during long-distance travel.

An electric motor (204) initiates the flywheel's rotation and sustains its operation as needed. Powered by the vehicle's battery, the electric motor can continue running even when the vehicle's ignition is turned off, ensuring uninterrupted power generation. The electric motor is controlled wirelessly via remote power on/off device (220), allowing the user to activate or deactivate the system conveniently through a vehicle key or an application in the mobile device. This wireless functionality enhances user convenience and supports efficient energy utilization.

The gearless design in FIG. 2 offers several distinct benefits. By eliminating gears, the system has reduced mechanical complexity with fewer moving parts, minimizing maintenance requirements and improving reliability. The absence of gear friction results in enhanced efficiency, reducing energy losses and streamlining energy transfer. The flywheel and connector's modular configuration allow for easy customization and installation across various vehicle types, including passenger cars, trucks, and other electric-powered vehicles.

FIG. 2 illustrates a highly efficient and cost-effective solution for power generation and recharging in electric vehicles. By simplifying the mechanical structure, reducing energy losses, and incorporating scalable, modular components, this embodiment addresses energy management challenges while offering adaptability to diverse applications.

Figure 3:
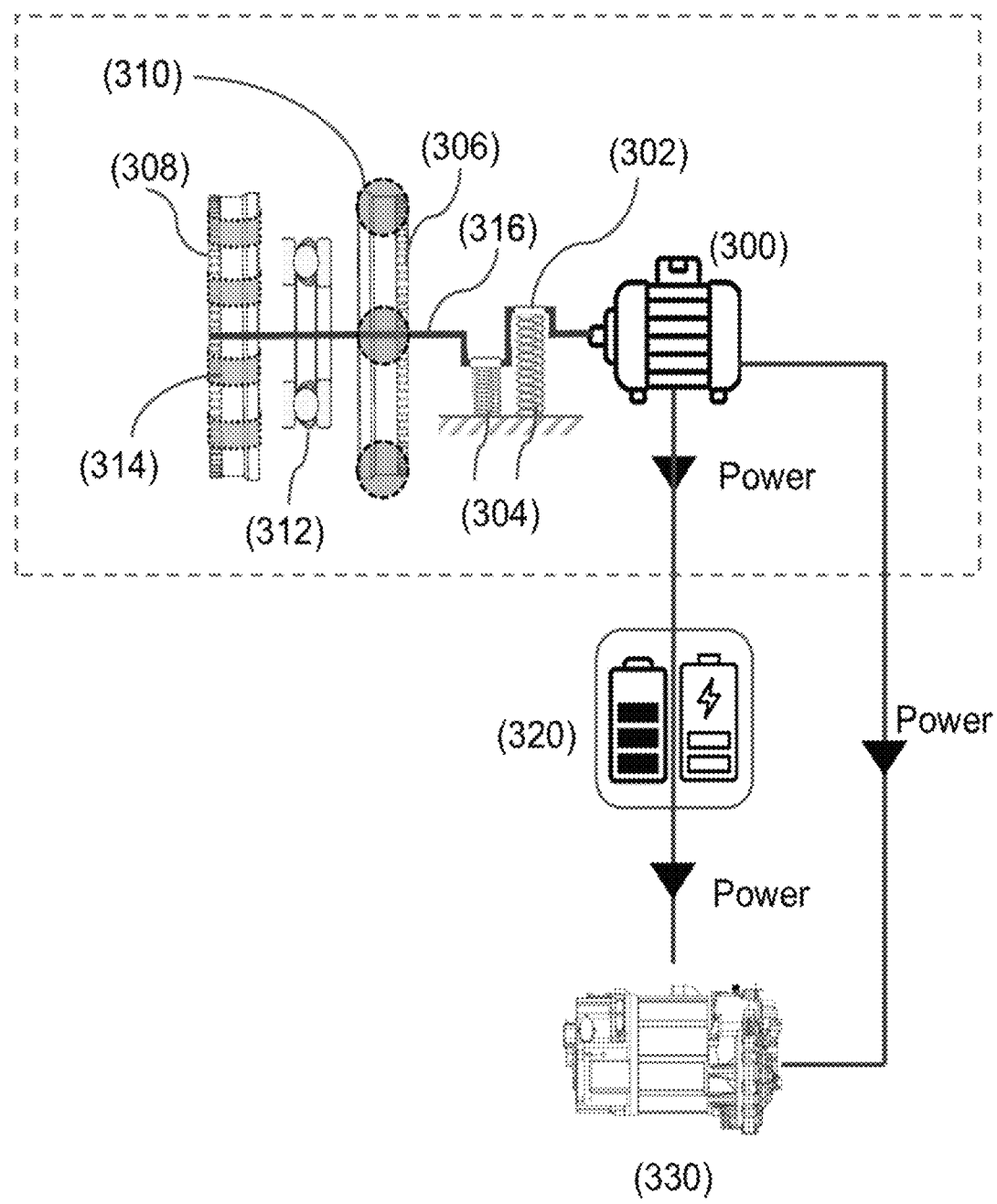
FIG. 3 illustrates an autonomous power generation and recharging system utilizing a spring-based mechanism in accordance with some embodiments.

FIG. 3 illustrates an embodiment of the autonomous power generation and recharging system that utilizes a spring-based mechanism to provide rotational energy to the generator. This configuration is particularly suited for environments where external power input is limited or unavailable. The components of this embodiment include a flywheel, a spring mechanism, a generator, bearings, and optional blades, all of which work together to generate power autonomously.

The flywheel (306, 308) serves as the primary energy storage and transfer device. The flywheel is coupled with the spring mechanism (304), which supplies the initial rotational force. The spring stores energy from an external input, such as a manual force, and releases it to rotate the flywheel and maintain its motion. For example, when the initial external input (e.g., rotating the flywheel by hand) is applied to the spring, the spring accumulates tension, which is then used to continuously rotate the shaft and flywheel. This spring-based design offers the advantage of being able to continuously operate the generator even after the initial energy is consumed, greatly improving the device's energy efficiency. The flywheel (308) is optional and can be installed or omitted based on user preference.

The flywheel is equipped with weight control balls (310) mounted on its outer edge, which enhance rotational stability and maximize the storage of kinetic energy by increasing centrifugal force. The flywheel's diameter can be adjusted to accommodate different vehicle sizes and energy requirements, with typical dimensions ranging from 20 to 40 inches but not limited to this range.

The spring mechanism (304) is an element in this embodiment, designed to store and release mechanical energy. When the external input, such as manual rotation, is applied, the spring is compressed or wound, storing potential energy. This stored energy is gradually released, providing a sustained rotational force to the flywheel and, subsequently, the generator. The spring mechanism ensures continuous operation without the need for an external input, making it particularly valuable in off-grid or remote scenarios. Depending on the tension and amount of energy stored in the spring, it is possible to use a single spring while using two or more springs is preferable for optimal performance.

The generator (300) is coupled with the flywheel via a shaft (316) and bearings (302, 312). The bearings are strategically positioned to reduce friction and minimize energy loss during operation. As the flywheel rotates, the generator converts the mechanical energy into electrical energy, which is then routed through an inverter or a converter for use. The generated electricity can either be stored in the vehicle's battery (320) or supplied to the motor (e.g., traction motor) for immediate use.

Optional blades (314) can be attached to the flywheel to capture wind energy during vehicle motion. These blades, designed in a scoop-like shape, provide additional rotational force to the flywheel, enhancing the overall energy generation capacity. The blades are adjustable in size and angle to optimize performance under varying wind conditions.

The modular design of the spring-based system allows it to be installed in various locations, such as the external cargo area of a pickup truck or similar vehicles. This flexibility ensures compatibility with a wide range of vehicle types and use cases. Additionally, the system can be scaled to accommodate different energy demands, making it suitable for both small electric vehicles and larger applications, such as industrial equipment or off-grid power supplies.

FIG. 3 offers several advantages. By utilizing a spring mechanism, the system eliminates the need for continuous external power input to initiate and sustain operation. This feature reduces reliance on external power sources and enhances the vehicle's power sufficiency. Furthermore, the spring-based design is highly durable and requires minimal maintenance, as it involves fewer complex moving parts compared to traditional systems.

This embodiment provides an efficient solution for energy management in electric vehicles, particularly in scenarios where external power sources are scarce or impractical. The combination of a spring-based flywheel mechanism and optional wind energy capture ensures continuous power generation, making it a versatile and reliable configuration for various applications.

The present disclosure introduces transformative advancements in energy management for electric vehicles (EVs), addressing limitations of existing technologies. By enhancing efficiency, sustainability, and user convenience, the disclosure offers various advantages.

The disclosure enhances energy sufficiency by enabling EVs to autonomously generate power during both motion and stationary conditions, significantly reducing reliance on external charging stations. This operation ensures continuous functionality, even in remote or rural areas with limited charging infrastructure. Through the features such as flywheels with weight control balls, gear-based or gearless configurations, and optional wind-capturing blades, the disclosure maximizes energy generation and its storage efficiency.

The modular construction of components, including the flywheel and optional gears, allows for flexible customization and straightforward maintenance. This approach reduces manufacturing complexity and operational costs, making the system economically viable for mass production. Additionally, the ability to reuse components, such as the gear-mounted or integrated flywheel assembly, further enhances cost savings.

The system offers flexible power distribution capabilities. Generated electricity can be either stored in the battery for future use or delivered to the traction motor for immediate use, bypassing storage-related losses and improving overall energy efficiency. This versatility enhances overall system flexibility.

The present disclosure revolutionizes energy management for EVs by integrating autonomous power generation and storage technologies into an efficient, cost-effective, and user-friendly system. By addressing challenges such as energy inefficiency, limited charging infrastructure, and environmental concerns, this disclosure provides a transformative solution for sustainable and efficient electric transportation.

While the primary application of the present disclosure is for electric vehicles (EVs), its autonomous power generation capabilities and modular, flexible design allow it to be utilized in various industries. Below are examples of potential commercial applications.

The present disclosure can be applied in the military industry, particularly for military vehicles that operate in remote or battlefield environments where charging infrastructure is scarce or nonexistent. These vehicles require a reliable and sustaining power source to ensure continuous operation under critical conditions. The disclosure provides an independent and autonomous power generation system, enabling military vehicles to function for extended periods without relying on external power sources.

To enhance the applicability of the system in military environments, the disclosure can be optimized to minimize weight and volume, ensuring seamless integration into various types of military vehicles, including armored personnel carriers and transport trucks. By reducing dependence on conventional fuel or external charging infrastructure, the system enhances mission flexibility and operational readiness.

Moreover, the ability to autonomously generate power allows military vehicles to maintain mobility in emergency situations, such as when supply lines are disrupted or during prolonged missions in hostile or isolated territories. The disclosure's modular design also allows for adaptability in different vehicle configurations, making it a versatile solution for defense applications. By incorporating this technology, military forces can significantly improve the endurance, energy efficiency, and reliability of their vehicle fleets in challenging environments.

The disclosure can be applied for long-haul freight vehicles, including trucks, trailers, and pickup trucks, which frequently operate over extended distances with limited access to charging infrastructure. By integrating the system, vehicles can autonomously generate power during operation to recharge the battery or supply energy to the vehicle's motor (e.g., a traction motor).

Trains and light rail vehicles are well-suited to adopt the disclosure's autonomous power generation capabilities. The disclosure is also applicable to large-scale agricultural and construction machinery, such as tractors, excavators, and cranes, which often operate in remote areas with limited access to external power sources. The spring-powered system is especially advantageous, as it minimizes the need for external energy during initial operation and provides continuous power generation during use. In the maritime industry, the disclosure can be adapted for use in electric ships, small vessels, and yachts, where autonomous power generation is critical for extended voyages. Using the blade-based system, wind energy can be used to generate power at sea.

The disclosure's versatility and autonomous energy generation capabilities make it applicable across diverse industries. Its modular design addresses energy management challenges not only in EVs but also in logistics, rail systems, agriculture, maritime operations, and renewable energy storage. These examples emphasize the disclosure's potential to deliver efficient and sustainable power solutions across a wide range of applications.

The foregoing description, for the purpose of explanation, has been described with reference to specific embodiments. However, the illustrative discussions above are not intended to be exhaustive or to limit the invention to the precise forms disclosed. Although the subject matter has been described in language specific to structural features and/or methodological steps, it is to be understood that the subject matter defined in the appended claims is not necessarily limited to the specific embodiments, features, or steps described above. Rather, the specific embodiments, features, and steps described above are disclosed as example forms of implementing the claims. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A power generation and recharging apparatus for a vehicle, comprising:
    at least one generator connected to a vehicle battery; and
    at least one flywheel coupled with the at least one generator and configured to provide rotational energy,
    wherein the at least one generator converts the rotational energy into electricity, which is stored in the vehicle battery or supplied to a traction motor for vehicle propulsion based on a user selection,
    wherein the at least one flywheel further includes a weight control ball mounted at an outer edge of the at least one flywheel to increase centrifugal force during rotation, and
    wherein the weight control ball is made of carbon, metal, or a combination thereof.

2. The apparatus of claim 1, further comprising at least one gear configured to transmit the rotational energy in the at least one flywheel to the at least one generator,
    wherein the at least one gear is located between the at least one flywheel and the at least one generator.

3. A power generation and recharging apparatus for a vehicle, comprising:
    at least one generator connected to a vehicle battery;
    at least one flywheel coupled with the at least one generator and configured to provide rotational energy;
    at least one gear; and
    at least one electric motor configured to initially rotate the at least one flywheel,
    wherein the at least one generator converts the rotational energy into electricity, which is stored in the vehicle battery or supplied to a traction motor for vehicle propulsion based on a user selection,
    wherein the at least one gear comprises a first gear, a second gear, and a third gear, the first gear having a lager diameter than that of the second gear or the third gear,
    wherein the first gear is coupled with the flywheel, and is engaged with and driven by the at least one electronic motor, and
    wherein the second gear and the third gear, being meshed with the first gear, are coupled with the at least one generator maintaining a uniform rotational speed (RPM).

4. A power generation and recharging apparatus for a vehicle, comprising:
    at least one generator connected to a vehicle battery;
    at least one flywheel coupled with the at least one generator and configured to provide rotational energy; and
    at least one gear,
    wherein the at least one generator converts the rotational energy into electricity, which is stored in the vehicle battery or supplied to a traction motor for vehicle propulsion based on a user selection,
    wherein the at least one generator comprises a first generator and a second generator, and
    wherein the at least one gear includes a second gear and a third gear, ratios and sizes of the second gear and the third gear being configured to accommodate the first generator and the second generator respectively.

5. The apparatus of claim 2, wherein the at least one gear is modularly designed to be separately mountable onto the at least one flywheel.

6. The apparatus of claim 2, wherein the at least one gear and the at least one flywheel are coupled to one another as an integrated assembly.

7. A power generation and recharging apparatus for a vehicle, comprising:
    at least one generator connected to a vehicle battery; and
    at least one flywheel coupled with the at least one generator and configured to provide rotational energy,
    wherein the at least one generator converts the rotational energy into electricity, which is stored in the vehicle battery or supplied to a traction motor for vehicle propulsion based on a user selection, and
    wherein the at least one flywheel is initially rotated by an external input and is coupled with a spring assembly that uses spring tension to continuously rotate the at least one generator.

8. The apparatus of claim 1, further comprising at least one blade configured to rotate the at least one flywheel by utilizing wind energy,
    wherein the at least one blade is adjustable in size and angle, and the at least one blade further includes a weight control ball mounted at an outer edge of the at least one blade.

9. The apparatus of claim 1, further comprising an inverter or a converter configured to process a conversion of the electricity generated by the at least one generator and store the electricity in the vehicle battery.

10. The apparatus of claim 3, wherein the at least one electric motor and the at least one generator continue generating power after a vehicle ignition is turned off, and is controlled wirelessly through a power control device, using a vehicle key or a mobile device.

11. The apparatus of claim 1, wherein the apparatus is installable either inside or outside the vehicle.

12. The apparatus of claim 1, further comprising at least one electric motor, wherein the at least one electric motor and the at least one generator continue generating power after a vehicle ignition is turned off, and is controlled wirelessly through a power control device, using a vehicle key or a mobile device.

13. The apparatus of claim 4, further comprising at least one electric motor, wherein the at least one electric motor and the at least one generator continue generating power after a vehicle ignition is turned off, and is controlled wirelessly through a power control device, using a vehicle key or a mobile device.

14. The apparatus of claim 7, further comprising at least one electric motor, wherein the at least one electric motor and the at least one generator continues generating power after a vehicle ignition is turned off, and is controlled wirelessly through a power control device, using a vehicle key or a mobile device.

\* \* \* \* \*